United States Patent
Nagatsuka et al.

(10) Patent No.: US 10,393,243 B2
(45) Date of Patent: Aug. 27, 2019

(54) ACTUATOR WITH CROSS-ROLLER BEARING

(71) Applicant: THK CO., LTD., Tokyo (JP)

(72) Inventors: Masaki Nagatsuka, Tokyo (JP); Yasuto Shiigi, Tokyo (JP)

(73) Assignee: THK CO., LTD., Tokyo (JP)

( * ) Notice: Subject to any disclaimer, the term of this patent is extended or adjusted under 35 U.S.C. 154(b) by 210 days.

(21) Appl. No.: 14/914,376

(22) PCT Filed: Sep. 5, 2014

(86) PCT No.: PCT/JP2014/073563
§ 371 (c)(1),
(2) Date: Feb. 25, 2016

(87) PCT Pub. No.: WO2015/034066
PCT Pub. Date: Mar. 12, 2015

(65) Prior Publication Data
US 2016/0208894 A1    Jul. 21, 2016

(30) Foreign Application Priority Data

Sep. 5, 2013  (JP) ................. 2013-184378
Sep. 5, 2014  (JP) ................. 2014-181223

(51) Int. Cl.
*F16H 25/22*  (2006.01)
*F16H 25/24*  (2006.01)
(Continued)

(52) U.S. Cl.
CPC ......... *F16H 25/2204* (2013.01); *F16H 25/20* (2013.01); *F16H 25/2025* (2013.01);
(Continued)

(58) Field of Classification Search
CPC .................................................. F16H 25/2247
See application file for complete search history.

(56) References Cited

U.S. PATENT DOCUMENTS

| | | | |
|---|---|---|---|
| 2009/0049938 A1* | 2/2009 | Teramachi | F16H 25/2204 74/22 A |
| 2009/0288511 A1* | 11/2009 | Kuribayashi | F16H 25/20 74/89.38 |
| 2014/0157919 A1 | 6/2014 | Kondo | |

FOREIGN PATENT DOCUMENTS

| | | |
|---|---|---|
| JP | 2003-83416 A | 3/2003 |
| JP | 2005-73320 A | 3/2005 |

(Continued)

OTHER PUBLICATIONS

International Search Report dated Dec. 9, 2014, issued in counterpart Application No. PCT/JP2014/073563 (2 pages).

*Primary Examiner* — William Kelleher
*Assistant Examiner* — Gregory T Prather
(74) *Attorney, Agent, or Firm* — Westerman, Hattori, Daniels & Adrian, LLP

(57) ABSTRACT

There is provided an actuator capable of downsizing the actuator in axial and radial directions of a motor. The actuator includes a motor having an output shaft, a motor housing into which the motor is housed, an outer race, an inner race assembled with the outer race to be rotatable, a cross-roller bearing supporting an object to be rotatable so that the object member is constituted to be rotatable, wherein the outer race is mounted to the motor housing, the inner race is clamped by a support member rotating in accordance with the rotation of the output shaft and the object member fixed to the support member.

11 Claims, 5 Drawing Sheets

(51) Int. Cl.
 *H02K 7/06* (2006.01)
 *F16H 25/20* (2006.01)
(52) U.S. Cl.
 CPC ............... *F16H 25/24* (2013.01); *H02K 7/06* (2013.01); *F16H 2025/2075* (2013.01)

(56) References Cited

FOREIGN PATENT DOCUMENTS

| JP | 2007-32596 A | 2/2007 |
| JP | 2008-185043 A | 8/2008 |
| JP | 2010-69995 A | 4/2010 |
| JP | 3174891 U | 4/2012 |
| WO | 2013/008539 A1 | 1/2013 |

* cited by examiner

ACTUATOR WITH CROSS-ROLLER BEARING

FIELD OF THE INVENTION

The present invention relates to an actuator, particularly, driven by rotation of a motor as driving force.

BACKGROUND TECHNOLOGY

Conventionally, there is known an actuator using a motor for rotationally driving an object member by rotating the motor. Further, as such actuator, there is also known a rod-type actuator adopting a direct-drive type structure in which a ball screw-nut of a ball screw assembly is adopted as such object member and a screw shaft screw-engaged with the ball screw-nut assembly is moved in an axial direction thereof.

PRIOR ART DOCUMENT

Patent Document

Patent Document 1: Japanese Patent Laid-open Publication No. 2007-32596

SUMMARY OF THE INVENTION

Problems to be Solved by the Invention

However, in a direct-drive type actuator disclosed in the Patent Document 1, since it is necessary to be subjected to loads from rotating direction and axial direction, there is adopted a so-called angular-contact bearing, in which two bearings are mated in back-to-back arrangement, to thereby receive these loads. Moreover, because the direct-drive type actuator disclosed in the Patent Document 1 has the back-to-back arrangement, it is difficult to make short the length in the axial direction, and in addition, because an outer periphery of the screw-nut is held by an inner periphery of the bearing, a diameter of the bearing is made larger, and it is hence difficult to make small a size or dimension of the direct-drive type actuator, thus being inconvenient.

Furthermore, in the direct-drive type actuator disclosed in the Patent Document 1, a cover member covering the screw shaft is mounted to an end portion of a case in which the motor and the ball screw-nut are housed. According to such arrangement, however, there arises such a fear as that when the screw shaft is shrunk, the axial dimension of the actuator becomes longer by a contracted length of the cover member, thus being also inconvenient.

The present invention was made to solve inconveniences encountered in the prior art mentioned above and an object thereof is to provide an actuator capable of being constructed in compact size in both the axial direction and radial direction of a motor.

Means for Solving the Problem

The actuator according to the present invention includes a motor having an output shaft, a motor housing into which the motor is housed, an outer race, an inner race assembled with the outer race to be rotatable, a cross-roller bearing supporting an object to be rotatable in a way that the object member is constituted to be rotatable, wherein the outer race is mounted to the motor housing, the inner race is clamped by a support member rotating in accordance with the rotation of the output shaft and the object member fixed to the support member.

Effect of the Invention

According to the present invention, since the cross-roller bearing is adopted, loads in the axial direction and the rotational direction can be subjected and received by a single bearing, and in addition, since the inner race of the cross-roller bearing is snapped between the object member and the support member rotating in accordance with the output shaft, the number of structural components or members can be eliminated to thereby make compact the actuator.

EMBODIMENT FOR CARRYING OUT THE INVENTION

Hereunder, embodiments of an actuator of the present invention will be explained with reference to the accompanying drawings. It is further to be noted that the following embodiments are not ones for limiting the inventions of the respective claims, and all the combination of subject features explained in the embodiments is not always essential for the solution of the solving means of the present invention.

First Embodiment

Figure 1:
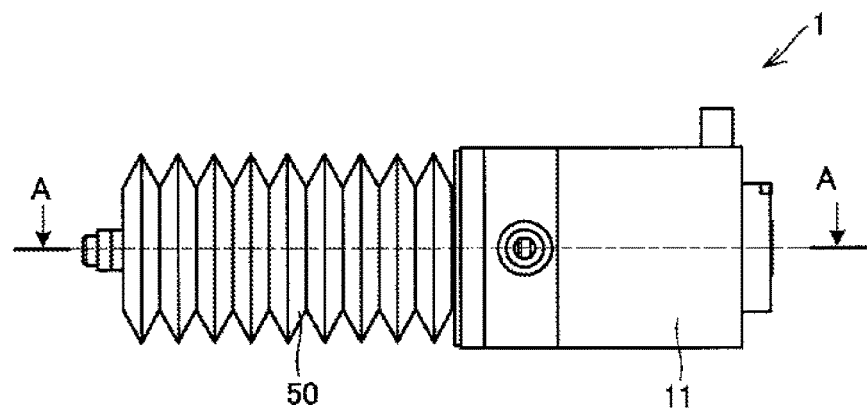
FIG. 1 is a front view of an actuator according to a first embodiment of the present invention.
Figure 2:
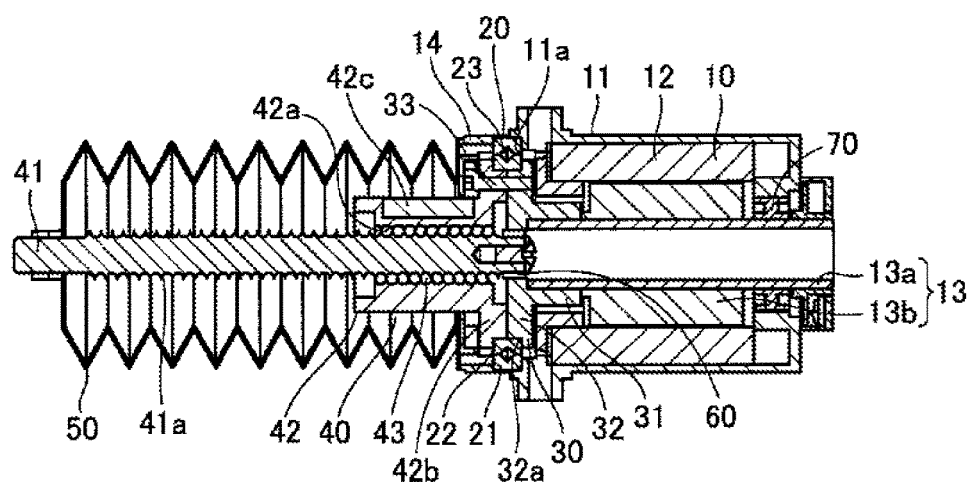
FIG. 2 is a sectional view taken along the line A-A in FIG. 1.
Figure 3:
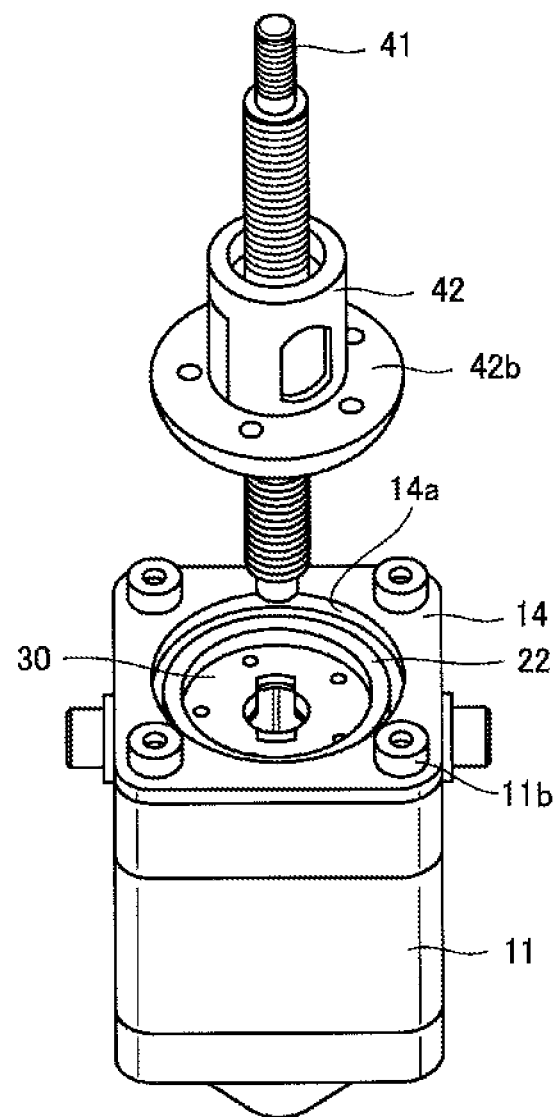
FIG. 3 is a developed view of the actuator according to the first embodiment of the present invention.
Figure 4:
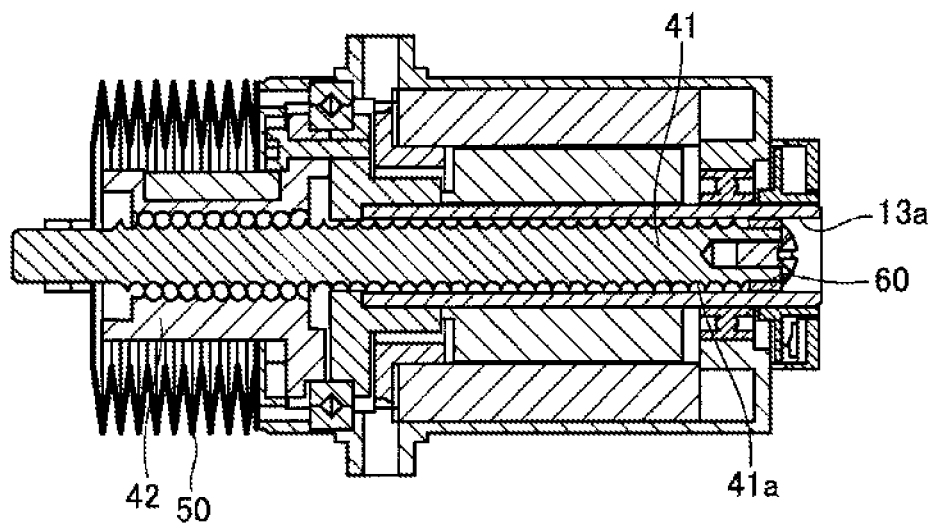
FIG. 4 is a sectional view showing a state in which a screw shaft is contracted (shrunk).

FIG. 1 is a front view of an actuator according to a first embodiment of the present invention, FIG. 2 is a sectional view taken along the line A-A in FIG. 1, FIG. 3 is a developed view of the actuator according to the first embodiment of the present invention, and FIG. 4 is a sectional view showing a state in which a screw shaft is contracted.

As shown in FIG. 1, an actuator 1 according to the present embodiment is provided with a motor housing 11 in which a motor is accommodated and an extendable member 50.

As shown in FIG. 2, a motor 10 housed in the motor housing 11 has a rotor 13 having an hollow output shaft 13a formed with a through hole along the axial direction thereof, a permanent magnet 13b arranged around an outer periphery of the output shaft 13a, and a stator coil 12 arranged along and around the rotor 13 with a gap in a circumferential direction of the rotor 13. The stator coil 12 is attached to an inner peripheral wall portion of the motor housing 11, and a base end side portion of the output shaft 13a is supported to be rotatable by a bearing 70 mounted to a bottom portion of the motor housing 11. Further, it is to be noted that, in the description of the present embodiment, a front end side of the output shaft 13a accords with the left end side of the output shaft 13a in FIG. 2, the base end side accords with the right end side thereof, and the following description is made according to the above definition.

The front end side of the output shaft 13a is supported to be rotatable by a cross-roller bearing 20, which is provided with an outer race 21 formed, on an inner peripheral side thereof, with a rolling surface having a V-sectional shape, an inner race 22 assembled to the outer race 21 to be rotatable and formed, on an outer peripheral surface thereof, with a rolling surface having a V-sectional shape so as to oppose to the rolling surface of the outer race 21, and a plurality of rollers disposed and arranged between the rolling surfaces of the outer race 21 and the inner race 22 in a manner such that a rotating axis of one tubular roller 23 intersects a rotation axis of adjacent roller 23 when viewed with one roller 23 behind an adjacent roller 23.

Furthermore, a ball screw 40, as an object member, is attached to the front end side of the output shaft 13a via a support member 30, and when a ball screw-nut 42 as nut member is rotated by the rotation of the motor 10, a screw shaft 41 screw-engaged with the ball screw-nut 42 is constructed to be movable along the axial direction thereof.

The support member 30 is provided with a shaft attaching portion 31 fitted to the front end side of the output shaft 13a and an enlarged diameter portion 32 extending in the radial direction from the end portion of the shaft attaching portion 31. A recessed portion 32a is formed to the front end of an enlarged diameter portion 32 along the outer periphery thereof.

The ball screw 40 is provided with a screw shaft 41 formed, on the outer peripheral surface thereof, with a spiral rolling member rolling surface 41a at a predetermined lead angle, a ball screw-nut having an axial through hole through which the screw shaft 41 penetrates and formed, on the inner peripheral surface of the through hole, with a loaded rolling member rolling surface 42a so as to oppose to the rolling member rolling surface 41a, and a plurality of rolling members 43 rolling between the rolling member rolling surface 41a and the loaded rolling member rolling surface 42a. It is further to be noted that each of the rolling member rolling surface 41a and the loaded rolling member rolling surface 42a has a sectional shape having curvature slightly larger than the diameter of the rolling member 43 so as to provide a single circular arc or so-called circular-arc shape.

Further, the rolling members 43 roll, with being applied with load, on a rolling member rolling path composed of the rolling member rolling surface 41a and the loaded rolling member rolling surface 42a, and the rolling member 43 which has rolled from a starting point to a terminal point, returns to the start point of the rolling member rolling path by a rolling member return path formed to a return member 42c attached to the ball screw-nut 42, thereby performing an endless circulation.

Furthermore, the ball screw-nut 42 is formed with a flanged portion 42b so as to expand in the radial direction thereof for mounting the ball screw-nut 42 to the output shaft 13a, and supported by the cross-roller bearing 20 to be rotatable.

The outer race 21 of the cross-roller bearing 20 is assembled to a receive seat 11a formed to the end portion of the motor housing 11 and fixed in a clamped manner by the lid member 14 and the motor housing 11. The motor housing 11 and the lid member 14 is fixedly fastened, as shown in FIG. 3, by fastening bolts 11b, which are disposed to corner portions of the motor housing 11, thereby preventing interference between the annular outer race 21 and the fastening bolts 11b in arrangement thereof.

Furthermore, the inner race 22 is assembled to be rotatable to the outer race 21 by clamping by the fanged portion 42b of the ball screw-nut 42. The support member 30 and the flanged portion 42b of the ball screw-nut 42 are fastened and fixed by means of bolts 33 with a predetermined gap therebetween so as to be rotatable.

As described above, since the output shaft 13a and the ball screw-nut 42 are supported by the cross-roller bearing 20 to be rotatable, the respective loads in the axial direction, radial direction and circumferential direction of the output shaft 13a and the ball screw-nut 42 of the single cross-roller bearing 20 can be born, and hence, constitutional elements or parts can be eliminated in number, thereby making compact the structure of the actuator 1.

Furthermore, since the inner race 22 is snapped by the recessed portion 32a of the support member 30 and the flanged portion 42b of the ball screw-nut 42a, it becomes possible to design the actuator 1 to be small in the radial dimension by adopting the cross-roller bearing having a small diameter without paying no attention to the diameter of the ball screw-nut 42.

Moreover, as shown in FIG. 3, the ball screw-nut 42 is assembled to the motor housing 11 through the hole 14a formed to the lid member 14 so as to protrude outward the motor housing 11 so as to cover the ball screw 40 with the expandable member 50 as shown in FIG. 2. According to such structure, it becomes possible to design the axial dimension of the motor housing 11 to be small. In addition, the ball screw-nut 42 and the inner race 22 are assembled with each other by means of bolt 33 along the axial direction from one axial side of the motor housing 11 (i.e., upper side on the drawing of FIG. 3). According to such structure, when it is required, for example, to change the lead of the ball screw 40 for the adjustment of the reduction ratio, the bolt 33 can be easily attached or detached without removing other members or components at the time of attachment or detachment of the bolt 33, thus easily exchanging the ball screw 40.

The expandable member 50 is, as shown in FIG. 2, a tubular member formed in bellows shape, and has one end attached to the motor housing 11 and another end attached to the front end of the screw shaft 41. According to such attachment, since the expandable member 50 is expanded or contracted in accordance with the movement of the screw shaft 41, invasion of dust or dirt into the interior of the actuator 1 and the exposure of the ball screw-nut to the outside can be prevented.

Further, as shown in FIG. 4, the expandable member 50 is contracted in foldable manner along the axial direction of the ball screw-nut 42, so-called, in the most contracted state in which the screw shaft 41 is moved on the base end side, and accordingly, the contracted length of the expandable member 50 does not affect the entire length of the actuator.

Furthermore, an anti-vibration means 60 is attached to the base end side of the screw shaft 41 for preventing, from contacting, the inner peripheral surface of the output shaft 13a and the rolling member rolling surface 41a formed in the outer peripheral surface of the screw shaft 41. The anti-vibration means 60 is composed of a color made of resin having a diameter slightly larger than that of the screw shaft 41 so that even if the base end of the screw shaft 41 is vibrated or swung in the radial and circumferential directions at the time of the axial movement of the base end of the screw shaft 41, the damage of the rolling member rolling surface 41a and adhesion of the dust and dirt thereto 41a by the contact between the inner peripheral surface of the output shaft 13a and the anti-vibration means 60 can be prevented, and accordingly, the screw shaft 41 can be designed to have a large diameter, thereby ensuring desired rigidity of the ball screw 40.

Second Embodiment

With the actuator 1 according to the first embodiment mentioned above, an object member is the ball screw-nut 42. On the other hand, in an actuator according to the second embodiment described hereinafter, the actuator has a mode different from the mode of the first embodiment. It is further to be noted that same or like reference numerals are added to members or components corresponding to those of the first embodiment, and detailed explanations thereof are omitted herein.

Figure 5:
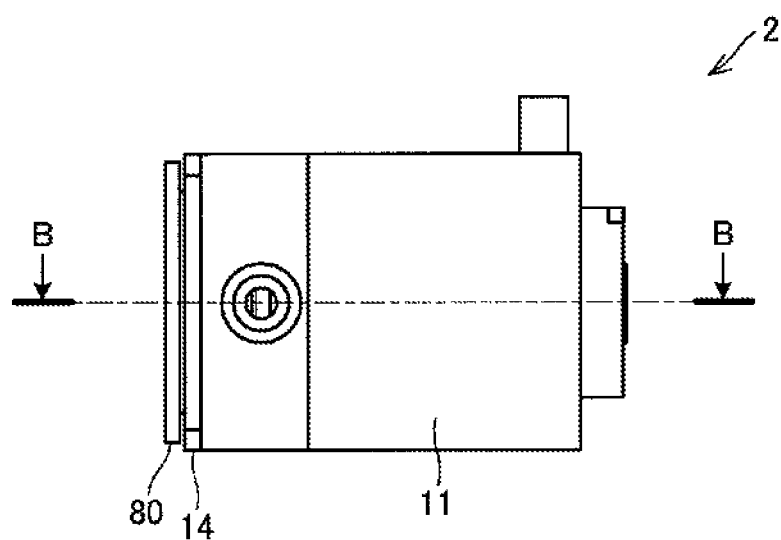
FIG. 5 is a front view of an actuator according to a second embodiment of the present invention.
Figure 6:
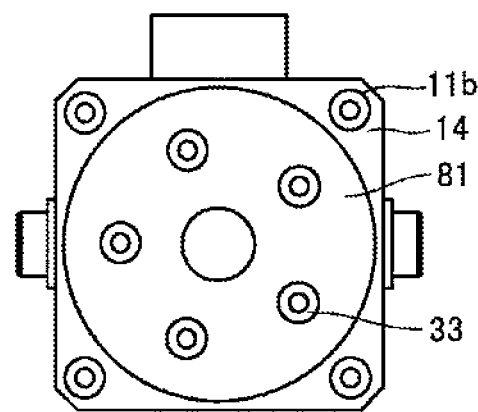
FIG. 6 is a side view of the actuator according to the second embodiment of the present invention.
Figure 7:
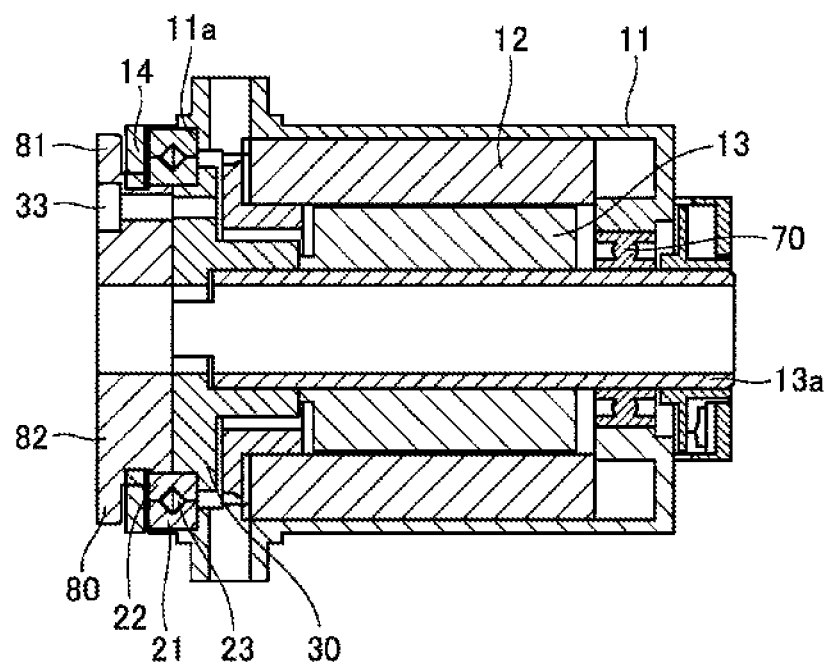
FIG. 7 is a sectional view taken along the line B-B in FIG. 5.

FIG. 5 is a front view of an actuator according to the second embodiment of the present invention, FIG. 6 is a side view of the actuator according to the second embodiment of the present invention, and FIG. 7 is a sectional view taken along the line B-B in FIG. 5.

As shown in FIG. 5, a rotatable table 80 is mounted as an object member to the actuator 2 according to the present invention. As also shown in FIG. 6, the rotatable table 80 is composed of a disc-shaped rotatable body 81 and a rotatable table shaft 82 extending axially from the rotatable body 81 as shown in FIG. 7.

The rotatable table 80 is mounted to the actuator 2 in the manner similar to the actuator 1 of the first embodiment, and the outer race 21 of the cross-roller bearing 20 is assembled to the receive seat 11a formed to the end portion of the motor housing 11 so as to be clamped by the lid member 14 and the motor housing 11 for the fixture thereof. The motor housing 11 and the lid member 14 are fastened and fixed by means of fastening bolts 11b as shown in FIG. 6, and these fastening bolts 11b are arranged to respective corner portions of the motor housing 11 so as not to interfere with the annular outer race 21.

On the other hand, the inner race 22 is assembled to be rotatable with respect to the outer race 21 in a state snapped by the recessed portion 32a of the support member 30 and the rotatable table body 81. The support member 30 and the ratable table 80 are fastened and fixed to each other with a predetermined gap between the support member 30 and the rotatable table body 81 by means of bolt 33.

Further, the rotatable table 80 is assembled to the motor housing 11 so as to protrude outward therefrom through the hole 14a formed to the lid member 14. Furthermore, the rotatable table 80 and the inner race 22 are assembled with each other by means of the bolt 33 along the axial direction from axial one end portion (left side end on the drawing of FIG. 7) of the motor housing 11. According to such configuration, when it is required to change the rotatable table 80 for changing a table diameter, for example, it is required to detach or attach the bolt 33. However, even in the removal of the bolt 33, it is not necessary to remove other components or members, and accordingly, the bolt 33 can be easily detached or attached, thereby also easily exchanging the rotatable table 80.

Third Embodiment

With the actuators 1 and 2 according to the first and second embodiments mentioned above, there is provided a case in which the output shaft 13a and the support member 30 are disposed coaxially. However, an actuator according to a third embodiment described hereinafter has a mode different from those of the first and second embodiments. It is further to be noted that same or like reference numerals are added to members or components corresponding to those of the first embodiment, and detailed explanations thereof are omitted herein.

Figure 8:
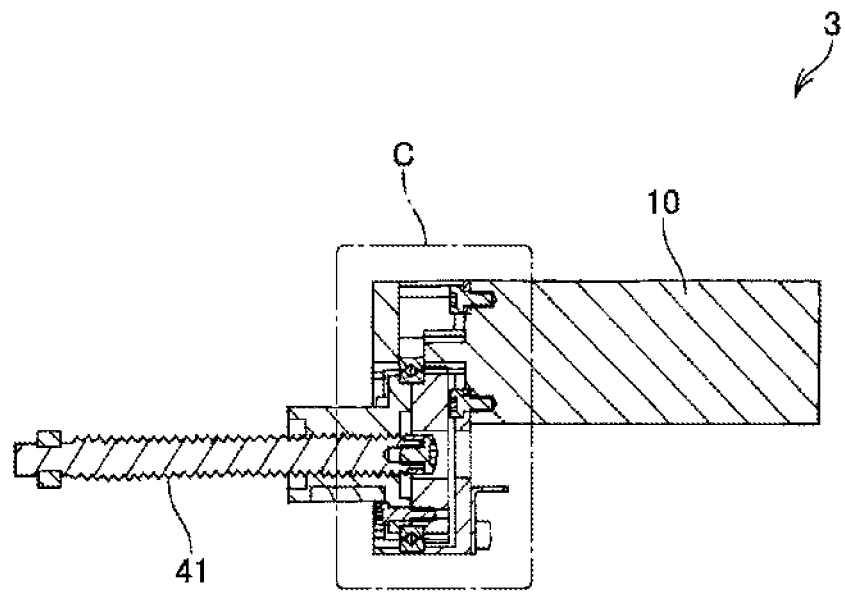
FIG. 8 is a sectional view of an actuator according to a third embodiment of the present invention.
Figure 9:
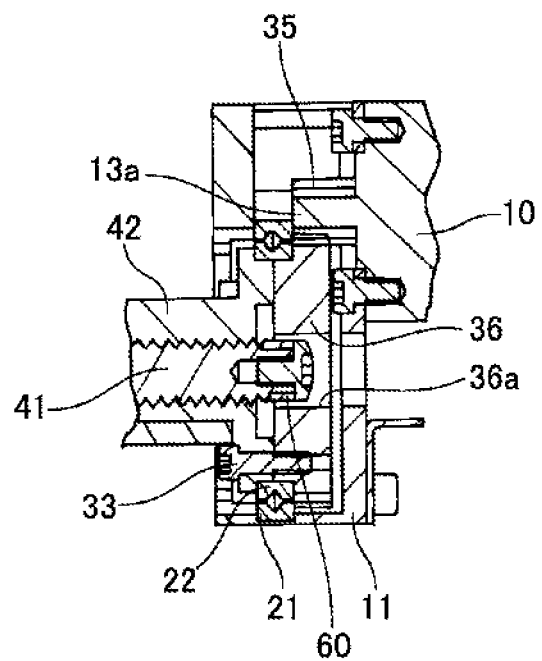
FIG. 9 is an enlarged view of a portion C in FIG. 8.

FIG. 8 is a sectional view of the actuator according to the third embodiment of the present invention, and FIG. 9 is an enlarged view of a portion C in FIG. 8.

As shown in FIG. 8, the actuator 3 according to the third embodiment is provided with a solid motor 10 for the output shaft 13a in such a manner as that the output shaft 13a and the screw shaft 41 are arranged in substantially parallel to each other. As mentioned above, the actuator 3 of the third embodiment uses the solid motor 10 for the output shaft 13a, so that a cheap motor is usable to thereby reduce cost performance.

Furthermore, the screw shaft 41 is assembled so as to be capable of advancing and retiring in the axial direction in accordance with the rotation of the ball screw-nut 42, and the screw shaft 41 is positioned in location displaced on the base end side. So-called in the most contracted state of the screw shaft 41, the screw shaft 41 takes a position protruding on the motor (10) side.

As shown in FIG. 9, a gear 35 is mounted to the output shaft 13a so as to be meshed with a rotational gear 36 as a support member concentrically arranged with the screw shaft 41. The rotational gear 36 is arranged in a manner such that the inner race 22 of the cross-roller bearing is clamped by the ball screw-nut 42 and the rotational gear 36, and the rotating motion of the motor 10 is transmitted to the ball screw-nut 42.

Further, the rotational gear 36 is formed with a through hole 36a through which the screw shaft 41 can penetrate so as to prevent the interference between the rotational gear 36 and the screw shaft 41 at the time when the screw shaft 41 is moved on the base end side.

Moreover, each of the gear 35 and the rotational gear 36 is formed as a helical gear having a tooth surface inclined with respect to a rotation axis, and according to such arrangement, such synergizing effects as reduction of noise and smooth gearing between the gear 35 and the rotational gear 36 can be achieved by the adoption of the cross-roller bearing.

In addition, the ball screw-nut 42, the inner race, and the rotational gear 36 are assembled with each other by means of the bolt 33 along the axial direction from the axial one end side (left side on the drawing of FIG. 9) of the motor housing 11. According to the structure mentioned above, when it is required, for example, to change the lead of the ball screw 40 for the adjustment of the reduction ratio, the bolt 33 can be easily attached or detached without removing other members or components at the time of attachment or detachment of the bolt 33, thus easily exchanging the ball screw 40.

It is further to be noted that the present invention is not limited to the embodiments described above and many other changes and modifications may be made without departing from the spirit of the present invention. For example, for the actuator 1 of the first embodiment, there is explained the case in which the rolling member rolling surface and the loaded rolling member rolling surface are formed in the circular-arc shape, it may be formed as so-called a gothic-arc shape in which two circular arcs are combined. Furthermore, in the above embodiments, although there is described the case in which the ball screw-nut 42 is adopted for the ball screw 40 in which the screw shaft 41 as a nut member and the ball screw 40 which are screw-engaged with each other through a plurality of rolling members 43, a nut member, so-called a slide-screw, to which the plurality of rolling members 43 are not interposed, may be adopted.

Furthermore, the actuator 1 according to the first embodiment is explained in the case where a tubular member formed in bellows shape is used as the expandable member, but the expandable member may take any other forms as long as it is expandable in the axial direction, and for example, so-called a telescopic member, in which a plurality of tubular members having different diameters are inserted to be mutually expandable, may be used, and otherwise, the expandable member may be composed of an elastic material such as rubber.

Moreover, the actuator 3 according to the third embodiment is explained with reference to the structure in which the base end side of the screw shaft 41 is exposed, but a structure in which the base end side of the screw shaft 41 is covered with a separate cover member in consideration of dust/dirt prevention characteristics. In such modified structure, an anti-vibration means may be mounted to the base end side of the screw shaft 41 as like as that 60 in the first embodiment. It is apparent from the recitation of the appended claims that modes, to which such modification or improvement are applicable, are within the technical scope of the present invention.

REFERENCE NUMERAL 1, 2 - - - actuator, 10 - - - motor, 11 - - - motor housing, 13a - - - output shaft, 20 - - - cross-roller bearing, 21 - - - outer race, 22 - - - inner race, 30 - - - support member, 40 - - - ball screw, 41 - - - screw shaft, 41a - - - rolling member rolling surface, 42 - - - ball screw-nut, 42a - - - loaded rolling member rolling surface, 43 - - - rolling member, 50 - - - expandable member, 60 - - - anti-vibration means

The invention claimed is:

1. An actuator comprising:
a motor having an output shaft;
a motor housing into which the motor is housed;
an outer race;
an inner race assembled with the outer race to be rotatable;
a cross-roller bearing supporting an object member to be rotatable, the object member having a first plane extending in the radial direction relative to the output shaft, and the first plane having a recessed portion at an outer periphery thereof;
a support member rotated in accordance with the rotation of the output shaft, the support member being fixed to the object member and having a second plane extending in a radial direction relative to the output shaft, the second plane having a recessed portion at an outer periphery thereof,
wherein the outer race is directly mounted to the motor housing and the inner race is clamped between the recessed portion of the first plane and the recessed portion of the second plane.

2. The actuator according to claim 1, wherein the object member is a nut member which is rotated in accordance with the rotation of the output shaft.

3. The actuator according to claim 2, wherein the screw shaft is formed with a helical rolling member rolling groove so as to extend in a longitudinal direction of the screw shaft, the nut member is formed with a through hole through which the screw shaft penetrates and which has an inner peripheral surface formed with a loaded rolling member rolling surface opposing to the rolling member rolling surface, a plurality of rolling members are disposed between the rolling member rolling surface and the loaded rolling member rolling surface, and the nut member is disposed so as to protrude from the motor housing.

4. The actuator according to claim 2, wherein the nut member has one end attached to the motor housing and another end covered with an expandable member mounted to the screw shaft.

5. The actuator according to claim 4, the support member is a rotational gear which is meshed with a gear mounted to the output shaft and supports the inner race together with the object member.

6. The actuator according to claim 2, wherein the screws shaft is provided, at a base end side thereof, with an anti-vibration means.

7. The actuator according to claim 2, wherein the output shaft has a hollow structure into which the screw shaft is inserted.

8. The actuator according to claim 2, wherein
the nut member includes a flange portion extending in the radial direction relative to the output shaft,
the support member includes a shaft attaching portion fitted to the output shaft and an enlarged diameter portion extending in the radial direction relative to the output shaft,
the first plane includes the flange portion, and
the second plane includes the enlarged diameter portion.

9. The actuator according to claim 2, wherein
the nut member includes a flange portion extending in the radial direction relative to the output shaft,
the support member includes a rotational gear meshed with the output shaft,
the first plane includes the flange portion, and
the second plane includes the rotational gear.

10. The actuator according to claim 1, wherein the object member is assembled to be detachable along an axial direction of the output shaft.

11. The actuator according to claim 1, wherein
the object member is a disc-shaped rotatable body and is rotated in accordance with the rotation of the output shaft, and
the support includes a shaft attaching portion fitted to the output shaft and an enlarged diameter portion extending in the radial direction relative to the output shaft,
the first plane includes the disc-shaped rotatable body, and
the second plane includes the enlarged diameter portion.

* * * * *